United States Patent
Fry et al.

(10) Patent No.: US 12,071,539 B2
(45) Date of Patent: *Aug. 27, 2024

(54) ELASTOMERIC ADDITIVE MANUFACTURING COMPOSITION

(71) Applicant: Jabil Inc., St. Petersburg, FL (US)

(72) Inventors: Thomas Fry, Victoria, MN (US); Zachary Peterson, New Hope, MN (US); Levi Loesch, Minneapolis, MN (US)

(73) Assignee: Jabil Inc., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/282,313

(22) PCT Filed: Apr. 15, 2022

(86) PCT No.: PCT/US2022/025038
§ 371 (c)(1),
(2) Date: Sep. 15, 2023

(87) PCT Pub. No.: WO2022/225816
PCT Pub. Date: Oct. 27, 2022

(65) Prior Publication Data
US 2024/0042677 A1     Feb. 8, 2024

Related U.S. Application Data

(60) Provisional application No. 63/176,606, filed on Apr. 19, 2021.

(51) Int. Cl.
| | | |
|---|---|---|
| *C08L 53/00* | (2006.01) |
| *B29C 64/118* | (2017.01) |
| *B29K 19/00* | (2006.01) |
| *B29K 21/00* | (2006.01) |
| *B29K 25/00* | (2006.01) |
| *B29K 61/00* | (2006.01) |
| *B29K 67/00* | (2006.01) |
| *B29K 71/00* | (2006.01) |
| *B29K 105/00* | (2006.01) |
| *B29K 105/16* | (2006.01) |
| *B33Y 10/00* | (2015.01) |
| *B33Y 70/00* | (2020.01) |
| *B33Y 80/00* | (2015.01) |
| *C08L 53/02* | (2006.01) |

(52) U.S. Cl.
CPC ............ *C08L 53/00* (2013.01); *B29C 64/118* (2017.08); *B33Y 10/00* (2014.12); *B33Y 70/00* (2014.12); *B33Y 80/00* (2014.12); *C08L 53/025* (2013.01); *B29K 2019/00* (2013.01); *B29K 2021/003* (2013.01); *B29K 2025/06* (2013.01); *B29K 2061/00* (2013.01); *B29K 2067/00* (2013.01); *B29K 2071/00* (2013.01); *B29K 2105/0005* (2013.01); *B29K 2105/16* (2013.01); *B29K 2995/0046* (2013.01); *B29K 2995/007* (2013.01); *B29K 2995/0077* (2013.01)

(58) Field of Classification Search
CPC . B29C 64/118; B29K 2021/003; B33Y 10/00; B33Y 40/00; B33Y 70/00; B33Y 80/00; C08G 69/40; C08L 53/00; C08L 53/02; C08L 53/025; C08L 73/00
See application file for complete search history.

(56) References Cited

U.S. PATENT DOCUMENTS

| | | | |
|---|---|---|---|
| 2,857,360 A | 10/1958 | Feuer | |
| 3,384,681 A | 5/1968 | Kobayashi | |
| 3,473,956 A | 10/1969 | McIntyre et al. | |
| 3,549,724 A | 12/1970 | Okazaki et al. | |
| 3,946,089 A | 3/1976 | Furukawa et al. | |
| 4,031,164 A | 6/1977 | Hedrick et al. | |
| 4,438,240 A | 3/1984 | Tanaka et al. | |
| 4,550,157 A | 10/1985 | Dai et al. | |
| 4,818,798 A * | 4/1989 | Gergen | C08L 73/00 525/445 |
| 4,839,437 A | 6/1989 | Gergen et al. | |
| 4,874,825 A | 10/1989 | Gergen | |

(Continued)

FOREIGN PATENT DOCUMENTS

| | | |
|---|---|---|
| CN | 109666256 A | 4/2019 |
| EP | 0345854 A2 | 12/1989 |

(Continued)

OTHER PUBLICATIONS

Bae et al., "The rheological design of aliphatic polyketone terpolymer blends with polyester thermoplastic elastomer", doi:10.1007/s13233-014-2173-z (Year: 2014).*

3DFlex™ TPE PEBAX Elastomer Flexible 3D Printing Filament information sheet. Printout from website: https://www.3dxtech.com/engineering-grade-filaments/flexible-filaments/3dxflex-pebax-tpe-flexible-3d-filament/ on Dec. 15, 2020 (3 pages).

Arnitel® PL461 TPC-ET Injection Molding technical data sheet from DSM 2021 (2 pages).

International Preliminary Report on Patentability issued in co-pending Application No. PCT/US2022/025038 mailed Mar. 17, 2023 (12 pages).

(Continued)

*Primary Examiner* — Ian A Rummel
*Assistant Examiner* — Rebecca L Grusby
(74) *Attorney, Agent, or Firm* — Young Basile Hanlon & MacFarlane, P.C.

(57) ABSTRACT

A composition useful for additive manufacturing is comprised of a thermoplastic elastomer blended with an aliphatic polyketone, wherein the thermoplastic elastomer is a continuous phase having dispersed therein separated domains of polyketone. The composition is useful for additive printing methods employing heating and extrusion of the composition to form extrudates that are printed an article comprised of fused layers of the composition. The composition facilitates the formation of extrusion based elastomeric additive manufactured articles.

20 Claims, No Drawings

(56) References Cited

U.S. PATENT DOCUMENTS

| | | | |
|---|---|---|---|
| 4,960,838 A | 10/1990 | Gergen et al. | |
| 4,965,310 A | 10/1990 | Harris et al. | |
| 5,121,329 A | 6/1992 | Crump | |
| 5,166,252 A | 11/1992 | George | |
| 5,486,594 A | 1/1996 | Gingrich et al. | |
| 5,503,785 A | 4/1996 | Crump et al. | |
| 5,998,519 A | 12/1999 | Goertz et al. | |
| 6,150,474 A | 11/2000 | Stoppelmann et al. | |
| 2013/0231225 A1 | 9/2013 | Shozda | |
| 2016/0185050 A1 | 6/2016 | Topolkaraev et al. | |
| 2018/0038015 A1* | 2/2018 | Sano | B33Y 70/00 |
| 2018/0282536 A1 | 10/2018 | Pang et al. | |
| 2019/0248965 A1 | 8/2019 | Bergmann | |
| 2020/0080236 A1 | 3/2020 | Fischer et al. | |
| 2020/0317867 A1 | 10/2020 | Hara et al. | |
| 2023/0242761 A1* | 8/2023 | Zander | C08L 51/06 525/66 |

FOREIGN PATENT DOCUMENTS

| | | |
|---|---|---|
| EP | 3287264 A1 | 2/2018 |
| EP | 4011600 A1 | 6/2022 |
| KR | 1020170039863 | 4/2017 |
| KR | 1020190024898 | 8/2019 |
| WO | 19955782 A1 | 11/1999 |
| WO | 2017100447 A1 | 6/2017 |
| WO | 2022005896 A1 | 1/2022 |

OTHER PUBLICATIONS

International Search Report and Written Opinion in co-pending application PCT/US2022/025038 mailed Oct. 13, 2022 (19 pages).
Kimya PEBA-S Filament—Ultimate 3D Printing Store, printout from website: https://ultimate3dprintingstore.com/products/kimya-peba-s-filament?variant=32027065352295 on Dec. 15, 2020 (5 pages).
Pebax® 2533 SA 01 technical data sheet from Arkema Specialty Polyamides (2 pages).
Pebax® 4033 SA 01 technical data sheet from Arkema Specialty Polyamides (2 pages).
Pebax® elastomers by Arkema, A Polymer in Motion, 2018. (11 pages).
Poketone technical guidebook, "High Performance Thermoplastic Polymer", 2020. (84 pages).
Zoltek PX35 Milled Carbon Fiber information sheet printed from Zoltek website: https://zoltek.com/products/px35/milled-fiber/ on Apr. 7, 2021 (2 pages).

* cited by examiner

ELASTOMERIC ADDITIVE MANUFACTURING COMPOSITION

CROSS-REFERENCE TO RELATED APPLICATIONS

This application is a National Stage 371 entry of PCT/US2022/025038 filed on Apr. 15, 2022, published as WO2022/225816, which claims priority to U.S. Provisional Patent Application No. 63/176,606 filed on Apr. 19, 2021, both of which are incorporated herein by reference in their entirety for all purposes.

FIELD

The present technology relates to elastomeric thermoplastic compositions useful in additive manufacturing. In particular, the compositions are useful in fused filament fabrication (FFF).

BACKGROUND OF THE INVENTION

Various additive manufacturing processes, also known as three-dimensional (3D) printing processes, can be used to form three-dimensional objects by fusing or adhering certain materials at particular locations and/or in layers. Material can be joined or solidified under computer control, for example working from a computer-aided design (CAD) model, to create a three-dimensional object, with material, such as liquid molecules, extruded materials including polymers, or powder grains, which can be fused and/or added in various ways including layer-by-layer approaches and print head deposition approaches. Various types of additive manufacturing processes include binder jetting, directed energy deposition, material extrusion, material jetting, powder bed fusion, sheet lamination, vat photopolymerization, and fused filament fabrication.

Fused filament fabrication (FFF) is an additive manufacturing process that employs a continuous filament that may include one or more thermoplastic materials. The filament is dispensed from a coil through a moving, heated extruder printer head, and deposited from the printer head in three dimensions to form the printed object. The printer head moves in two dimensions (e.g., an x-y plane) to deposit one horizontal plane, or layer, of the object being printed at a time. The printer head and/or the object being printed moves in a third dimension (e.g., a z-axis relative to the x-y plane) to begin a subsequent layer that adheres to the previously deposited layer and further described in U.S. Pat. Nos. 5,121,329 and 5,503,785. Because the technique requires melting of a filament and extrusion, the materials have been limited to thermoplastic polymers. Typically, the thermoplastic that has been most successfully printed by the FFF method are aliphatic polyamides (e.g., Nylon 6,6).

Thermoplastic elastomers (TPEs) such as thermoplastic polyurethane have been reported to have been additive manufactured by FFF, but have not had substantial commercial success due to problems such as water absorption and difficulty to print warp free articles as well as causing sticking to the feed apparatus in the print head and guide tubes of the printer. In particular, TPE filaments due to their flexibility and stickiness, have been difficult to successfully print using a Bowden extruder that pushes the filament through a low friction tube (e.g., fluoropolymer tube such as Teflon) to the heated extrusion print head.

Accordingly, it would be desirable to provide a thermoplastic elastomeric composition that avoids one or more of the problems of 3D printing such materials such as those described above and in particular the ability to be printed using a Bowden extruder.

SUMMARY OF THE INVENTION

It has been discovered that thermal plastic elastomeric copolymers (TPEs) when blended with an aliphatic ketone the elastic modulus increases (become stiffer) and the coefficient of friction decreases (becomes less sticky) while not significantly becoming harder or reducing the elongation to break (retain the desired elastomeric properties). These unique unexpected combination of properties facilitate the additive manufacturing of elastomeric articles particularly when using Bowden tube equipped 3d printers.

A first aspect of the invention is an additive manufacturing composition comprising a thermoplastic elastomer blended with an aliphatic polyketone, wherein the thermoplastic elastomer is a continuous phase having dispersed therein separated domains of polyketone. The additive composition may be used in any extrusion based additive manufacturing method such as FFF described above or other extrusion methods involving the heating and melting of a powder or pellet through a nozzle that is controllably deposited on a base and subsequent layers.

A second aspect of the invention is a method to form an additive manufactured article comprising, heating and extruding the composition of the 1st aspect through a print head to form an extrudate, and, controllably depositing the extrudate into multiple fused layers to form the additive manufactured article.

A third aspect of the invention is an additive manufactured article comprised of at least two layers fused together of the composition of the first aspect of the invention.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

The compositions are comprised of a thermoplastic elastomer (TPE). The TPE may be a styrenic thermoplastic elastomer (STPE), polyether block amide elastomer (PEBA) or mixture thereof. The STPE is a block copolymer comprised of at least two distinct blocks of a polymerized vinyl aromatic monomer and at least one block of a polymerized conjugated alkene monomer. wherein each block copolymer has at least two blocks of a vinyl aromatic monomer having up to 20 carbon atoms and a conjugated alkene monomer of formula:

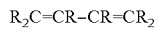

wherein each R, independently each occurrence, is hydrogen or alkyl of one to four carbons, where any two R groups may form a ring. The conjugated diene monomer has at least 4 carbons and no more than about 20 carbons. The conjugated alkene monomer can be any monomer having 2 or more conjugated double bonds. Such monomers include, for example, butadiene, 2-methyl-1,3-butadiene (isoprene), 2-methyl-1,3 pentadiene, and similar compounds, and mixtures thereof. The block copolymer can contain more than one specific polymerized conjugated alkene monomer. In other words, the block copolymer can contain, for example, a polymethylpentadiene block and a polyisoprene block or mixed block(s). In general, block copolymers contain long stretches of two or more monomeric units linked together. Suitable block copolymers typically have an amount of conjugated alkene monomer unit block to vinyl aromatic monomer unit block of from about 30:70 to about 95:5, 40:60 to about 90:10 or 50:50 to 65:35, based on the total weight of the conjugated alkene monomer unit and vinyl aromatic monomer unit blocks.

The vinyl monomer typically is a monomer of the formula:

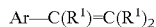

wherein each $R^1$ is independently, in each occurrence, hydrogen or alkyl or forms a ring with another $R^1$, Ar is phenyl, halophenyl, alkylphenyl, alkylhalophenyl, naphthyl, pyridinyl, or anthracenyl, wherein any alkyl group contains 1 to 6 carbon atoms which may optionally be mono or multi-substituted with functional groups. Examples of substituted functional groups include groups such as halo, nitro, amino, hydroxy, cyano, carbonyl and carboxyl groups. Typically, the vinyl aromatic monomer has less than or equal to 20 carbons and a single vinyl group. In one embodiment, Ar is phenyl or alkyl phenyl, and typically is phenyl. Typical vinyl aromatic monomers include styrene (including conditions whereby syndiotactic polystyrene blocks are produced), alpha-methylstyrene, all isomers of vinyl toluene, especially para-vinyltoluene, all isomers of ethyl styrene, propyl styrene, butyl styrene, vinyl biphenyl, vinyl naphthalene, vinyl anthracene and mixtures thereof. The block copolymer can contain more than one polymerized vinyl aromatic monomer. In other words, the block copolymer may contain a pure polystyrene block and a pure poly-alpha-methylstyrene block or any block may be made up of mixture of such monomers. Desirably, the A block is comprised of styrene and the B block is comprised of butadiene, isoprene or mixture thereof. In an embodiment, the double bonds remaining from the conjugated diene monomer are hydrogenated.

The STPE block copolymers of this invention include triblock, pentablock, multiblock, tapered block, and star block $((AB)_n)$ polymers, designated $A(B'A')_xB_y$, where in each and every occurrence A is a vinyl aromatic block or mixed block, B is an unsaturated alkenyl block or mixed block, A, in each occurrence, may be the same as A or of different components or $M_w$, B', in each occurrence, may be the same as B or of different components or $M_w$, n is the number of arms on a Star and ranges from 2 to 10, in one embodiment 3 to 8, and in another embodiment 4 to 6, x is ≥1 and y is 0 or 1. In one embodiment the block polymer is symmetrical such as, for example, a triblock with a vinyl aromatic polymer block of equal Mw, on each end. Typically, the STPE block copolymer will be an A-B-A or A-B-A-B-A type block copolymer. Desirably, the B block is hydrogenated, where a substantial portion (~50%, 70%, or even 90%) of the double bonds are hydrogenated to essentially all (99% or 99.9%) of the double bonds are hydrogenated.

The STPE block copolymers can have vinyl aromatic monomer unit blocks with individual weight average molecular weighted blocks, $M_w$, of from about 6,000, especially from about 8,000, to sum-total weighted aromatic blocks of about 15,000, to about 45,000. The sum-total, weight average molecular weight of the conjugated alkene monomer unit block(s) can be from about 20,000, especially from about 30,000, more especially from about 40,000 to about 150,000, and especially to about 130,000.

Desirably, the STPE is a styrene-(butadiene)-styrene (SBS), styrene-isoprene-styrene (SIS), styrene isoprene butylene styrene (SIBS), and/or styrene-(ethylene-butylene)-styrene (SEBS). Typically, the styrene blocks provide thermoplastic properties and the butadiene blocks provide the elastomeric properties and may be represented as follows:

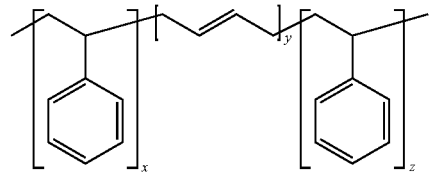

Where x, y, and z are integers to realize the $M_w$ for the blocks described above. Selective hydrogenation SBS results in styrene-(ethylene-butylene)-styrene (SEBS), as the elimination of the C=C bonds in the butadiene component generate ethylene and butylene mid-block. SEBS may be characterized by improved heat resistance, mechanical properties and chemical resistance. An example structure of SEBS may be represented by:

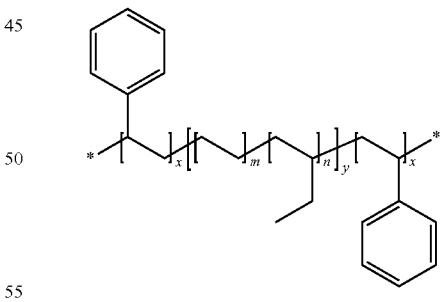

where x, y, z, m and n are any integer to realize the $M_w$ of the blocks as described above. Desirably, the STPE is comprised of i styrene-(butadiene)-styrene, styrene-(ethylene-butylene)-styrene or combination thereof. In an embodiment, the STPE is comprised of SEBS wherein essentially all of the unsaturated bonds of the source SBS have been hydrogenated.

The PEBA may be any useful polyether block amide elastomer such as those known in the art. Examples of useful PEBAs are described in U.S. Pat. Nos. 3,384,681; 3,473,956; 3,549,724; 3,946,089; 4,031,164; 4,438,240; and 4,550,157 each incorporated herein by reference. It is understood that the PEBA may include polymers that are polyether block amides and polyetherester block amides.

Illustratively, the polyether amide block copolymer comprises blocks of the polyamide and polyether. Such block polyether amide polymers may be represented by the repeating formula:

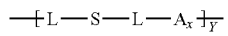

wherein S is a first chain that is the residue of a bifunctional polyether polymer (e.g., $H_2N-S-NH_2$) which typically has a molecular weight of about 500 to 6000, L is a linking group that is either an amide or urea (e.g., $-NH-CO-$ or $-NHCONH-$) and $A_x$ represents the unit structure of a polyamide having $-CONH-$ repeating units or polyurea having repeating $-NH-CO-NH-$ units in which the each repeating unit is attached to a carbon atom within the chain with x being at least 1 and y is such that the average molecular weight of the block copolymer is at least about 30,000 g/moles. The polyether segment of the PEBA may be any oxyalkene repeating unit such as those having from 2 to 8 carbons such as ethylene oxide or propylene oxide, oxytetramethylene or combination thereof.

The polyetherester block amide copolymer may be represented by the repeating formula:

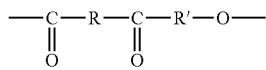

wherein R represents the polyamide moiety illustratively derived from a dicarboxylic polyamide loss of the two terminal carboxylic acid groups and R' is the polyoxyalkylene moiety illustratively derived by the loss of the two terminal hydroxy or amino groups from polyoxyakylene glycol or diamine.

Useful TPEs typically have a Shore A hardness value of about 50-90 or 60 to 80 (ASTM D 2240/ISO 868/ISO 7619), a tensile strength—perpendicular of about 3-8, 4-7 or 5-6 MPa (ASTM D412/ISO 37), a tensile strength @ 100%—perpendicular of about 2 to 6, 3-5.5, or 3.5-4.5 MPa (ASTM D412/ISO 37), an elongation @ break—perpendicular of about 200%-700%, 300%-600% or 400%-500% (ASTM D412/ISO 37), a tear strength—perpendicular of about 15 kN/m to 60 kN/m, 20 kN/m to 50 kN/m, 25 kN/m to 45 kN/m or 34 kN/m to 42 kN/m (ASTM D624/ISO 34), and a specific gravity (relative density) of about 0.8 to 1.0 (ASTM D792/ISO 1183). The melt flow rate (MFR) at 210° C. of the STPE may be any useful MFR, but typically is from about 10, 20, 50, 60, 70, 80, 90 g/10 min to 150, 140, 130, 120, or 110 g/10 min at 210° C. at 2.16 Kg (ASTM D1238).

The TPE desirably displays particular rheological behavior at printing conditions such that the STPE has sufficient flow such that it may be printed and fuse or adhere to the previous and subsequent layers when forming an article by FFF. For example, the viscosity of the STPE desirably exhibits shear thinning behavior at the additive manufacturing deposition temperature (extrusion temperature such as about 180° C., 190° C., 200° C. or 210° C. to about 250° C., 240° C., or 230° C.). In particular, the apparent viscosity at low shear ($1 \text{ s}^{-1}$) is about 200, 150, 100, 50 or 25 times greater compared to the viscosity at high shear ($5000 \text{ s}^{-1}$), wherein the viscosity at the low shear ($1 \text{ s}^{-1}$) is from about 1000 to 5000 Pa s. The viscosity may be determined by any suitable rheometer such as those known in the art. For example, a suitable rheometer is an Instron CEAST 20 capillary rheometer (Instron of Norwood, MA).

Suitable STPEs may include those commercially available under tradenames such as SEPTON and HYBRAR from Kuraray, (Houston, TX). STPEs that may be suitable are also available from Audia Elastomers (Washington, PA) under their trade designation TPE. Other suitable STPEs may include those available from Dynasol under the tradename CALPRENE, STPEs from Kraton Corporation (Houston, TX) under the tradename KRATON, Mexpolimeros (Mexico), and Asahi Kasei Corporation (Japan) under tradenames ASAPRENE and TUFPRENE. Suitable PEBAs may include those having the following tradenames: PEBAX available from Arkema Inc. (Pennsylvania); HYTREL available from Dupont (Delaware); and VESTAMID available from Evonik (Germany). The TPE may also be a thermoplastic elastomeric copolyester such as those available under the tradename ARNITEL available from DSM (Holland).

The polyketone polymers which may be employed to make the blends of the invention are linear aliphatic alternating copolymers of carbon monoxide and at least one ethylenically unsaturated hydrocarbon. Suitable ethylenically unsaturated hydrocarbons which may be useful as precursors of the polyketone polymers have up to 20 carbon atoms inclusive, preferably up to 10 carbon atoms inclusive and are aliphatic such as ethylene and other alpha-olefins including propylene, butylene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, mpropylsytrene and p-ethylstyrene. Desirably the polyketone polymers are copolymers of carbon monoxide and ethylene or terpolymers of carbon monoxide, ethylene and a second hydrocarbon of at least three carbon atoms, particularly an alpha-olefin such as propylene. The structure of the polyketone polymers is that of a linear alternating polymer and the polymer will contain substantially one molecule of carbon monoxide for each molecule of ethylenically unsaturated hydrocarbon. When terpolymers of carbon monoxide, ethylene and a second hydrocarbon are employed as a blend component in the blends of the invention, there will be within the terpolymer at least two units incorporating a moiety of ethylene for each unit incorporating a moiety of the second hydrocarbon. Preferably there will be from about 10 to about 100 units incorporating a moiety of ethylene for each unit incorporating a moiety of the second hydrocarbon. The polymer chain may be represented by the repeating formula:

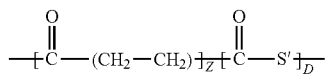

wherein S' is the moiety obtained by polymerization of the second hydrocarbon through the ethylenic unsaturation. The $-CO-(CH_2-CH_2)-$ units and the $-CO-(S')-$ units are found randomly through the polymer chain and the ratio of D:Z is no more than about 0.5. In the modification where copolymer of carbon monoxide and ethylene is employed as a blend component there will be no second hydrocarbon present and the polyketone polymer is represented by the above formula wherein D=0. When y is other than 0, i.e., terpolymers are employed, ratios of D:Z from about 0.01 to about 0.1 are preferred. The end groups or "caps" of the polymer chain will depend on what materials are present during the production of the polyketone and whether and how the polymer has been purified. The precise properties of the polymer will not depend upon the particular end groups to any considerable extent so that the polymer is fairly represented by the above formula for the polymer chain. Of particular interest are the polyketones of number average molecular weight from about 1,000 to about 200,000, particularly those of number average molecular weight from about 20,000 to about 90,000 as determined by gel permeation chromatography. The physical properties of such polymers will depend in part on the molecular weight, whether the polymer is a copolymer or a terpolymer, and in the case of terpolymers the proportion of the second hydrocarbon present. Typical melting points for such polymers are from about 175° C. to about 300° C., desirably about 210° C. to about 270° C. The polymers typically have a limiting viscosity number (LVN), measured in a standard capillary viscosity measuring device in m-cresol at 60° C., of from about to about 8, or about 0.8 to about 4.

Examples of the polyketone may include those commercially available such as those under the tradenames: AKROTEK available from Akro Plastic (China), and POKETONE available from Hyosung (South Korea).

The TPE and polyketone are blended in a proportion such that the polyketone is present in the blended polymer as dispersed separated domains within a continuous matrix of the TPE. Generally, the amount of polyketone is less than 40%, 30%, 25% or 20% to a sufficient amount to realize the desired stiffness and friction such as at least about 1%, 2% or 5% by weight. Desirably the equivalent spherical diameter average domain size is about 0.1 micrometer, 0.2 micrometer, 0.5 micrometer or 1 micrometer to about 500 micrometers, 250 micrometers, 100 micrometers, 50 micrometers, 25 micrometers or 10 micrometers. The size may be determined by micrographic techniques such as those known in the art and may employ digital image analysis or manual techniques such as line intercept methods applied to a micrograph. The domains are typically spheroidal but may be any shape such as ovoid.

Any method useful for heating and blending polymers may be employed such as those known for melt blending polymers to form the composition. When heating, typically shear is applied to realize the desired domain size and dispersion. Illustratively the heating and blending may be performed in a single or twin screw extruder such as those known in the art. The amount of shear may be any useful to realize desired blending and domain size of the polyketone. The extruder may be held at one temperature or have a gradient along the length of the extruder to facilitate the blending and dispersion of the polyketone in the TPE.

The composition may be comprised of other additives useful for additive manufacturing or imparting further desired properties and may include adhesion promoters (adhesion between layers of 3d printed article "z-direction"), plasticizers, friction modifiers, fillers and the like. Friction modifiers may include stearates such as alkaline earth stearates, transition metal stearates (e.g., zinc stearate) and the like.

Filler may be useful to facilitate the realization of a desirable characteristic or property of the 3D printed article. Typically, the filler has a specific surface area of about 0.05 $m^2/g$ to about 120 $m^2/g$, but, desirably, has a specific surface area of 0.1, 0.5, 1, 2 $m^2/g$ to about 50, 25, 20, or 10 $m^2/g$.

The filler particles may be individual particles or hard agglomerates such as commonly found in fumed silica and carbon blacks. Desirably, the fillers are individual particles. The amount of filler may vary over a large range relative to the composition so long as there is sufficient amount to realize the desired characteristic of the composition. Typically, the amount of filler is from about 1%, 2%, 5%, 10% to 70%, 60%, 50%, 40% or 30% by weight of the composition. The particular amount of filler may also be adjusted to realize one or more desired properties such as stiffness, tensile strength, toughness, heat resistance, color, and clarity of the resulting composition, filament or article formed therefrom.

Generally, the filler may be any shape (e.g., platy, blocky, acicular, whisker spheroidal or combination thereof). Desirably, the filler has an acicular morphology wherein the aspect ratio is at least 2 to 50, wherein the acicularity means herein that the morphology may be needlelike or platy, but preferably is platy. Needlelike meaning that there are two smaller equivalent dimensions (typically referred to as height and width) and one larger dimension (typically the length). Platy meaning that there are two larger somewhat equivalent dimensions (typically width and length) and one smaller dimension (typically height). More preferably, the aspect ratio is at least 3, 4 or 5 to 25, 20 or 15. The average aspect ratio may be determined by micrographic techniques measuring the longest and shortest dimension of a random representative sample of the particles (e.g., 100 to 200 particles).

The particulate size of the filler needs to be a useful size that is not too large (e.g., spans the smallest dimension of filament or causes the filament to become prone to breaking when bent under conditions usually encountered in additive manufacturing) and not too small that the desired effects on the processability and mechanical properties is not realized. In defining a useful size, the particle size and size distribution is given by the median size (D50), D10, D90 and a maximum size limitation. The size is the equivalent spherical diameter by volume as measured by a laser light scattering method (Rayleigh or Mie with Mie scattering being preferred) using dispersions of the solids in liquids at low solids loading. D10 is the size where 10% of the particles have a smaller size, D50 (median) is the size where 50% of the particles have a smaller size and D90 is the size where 90% of the particles have a smaller size by volume. Generally, the filler has an equivalent spherical diameter median (D50) particle size of 0.1 micrometer to 25 micrometers, D10 of 0.05 to 5 micrometers, D90 of 20 to 60 micrometers and essentially no particles greater than about 100 micrometers or even 50 micrometers and no particles smaller than about 0.01 micrometers. Desirably, the median is 0.5 to 5 or 10 micrometers, the D10 is 0.2 to 2 micrometers and the D90 is 5, 10 or 20 to 40 micrometers.

The filler may be any useful filler such as those known in the art. Examples of the filler ceramics, metals, carbon (e.g., graphite, carbon black, graphene), polymeric particulates that do not melt or decompose at the printing temperatures (e.g., cross-linked polymeric particulates, vulcanized rubber particulates and the like), plant based fillers (e.g., wood, nutshell, grain and rice hull flours or particles). Exemplary fillers include calcium carbonate, talc, silica, wollastonite, clay, calcium sulfate, mica, inorganic glass (e.g., silica, alumino-silicate, borosilicate, alkali alumino silicate and the like), oxides (e.g., alumina, zirconia, magnesia, silica "quartz", and calcia), carbides (e.g., boron carbide and silicon carbide), nitrides (e.g., silicon nitride, aluminum nitride), combinations of oxynitride, oxycarbides, or combination thereof. In certain embodiments, the filler comprises an acicular filler such as talc, clay minerals, chopped inorganic glass, metal, or carbon fibers, mullite, mica, wollastanite or combination thereof. In a particular embodiment, the filler is comprised of talc.

The plasticizer may be a polymer that is miscible with both the thermoplastic polymer and the polyketone. Illustratively, the thermoplastic polymer is a PEBA and the plasticizer is a polyamide. The polyamide plasticizer may be formed, for example, by taking a known commercial grade of Nylon (e.g., Nylon 6; Nylon 6,6; Nylon 4,6; Nylon 6,9; Nylon 5,10; Nylon 6,10; Nylon 11; Nylon 6,12 and Nylon 12) and chopping it as per the chain scission method described in copending Int. Appl. No. PCT/US2021/019391, incorporated herein by reference. Generally, for such plasticizers, the molecular weight is about 5000 g/moles or to about 500,000 or 100,000 g/moles and the melt flow rate (MFR) is at least about 50, 70, 80, 90 g/10 min to any practical flow rate, 150, 140, 130, 120, or 110 g/10 min at 210° C. at 2.16 Kg (ASTM D1238)

The compositions may be formed into various forms useful in various 3D printing methods such as fused filament fabrication methods. For example, the composition may be formed into powder, pellets, rods or filaments that are then heated and fused. Illustratively, the method is FFF, where the filament can be dimensioned in cross-section shape, diameter, and length for use in various fused filament fabrication methods to print various objects using various print heads. The filament can be formed as it is being used in a printing process or the filament can be pre-formed and stored for later use in a printing process. The filament may be wound upon a spool to aid in storage and dispensing. The filament can be formed in various ways, including various extrusion methods using various dies, such as hot extrusion and cold extrusion methods.

In certain embodiments, the fused filament fabrication method can employ material extrusion of the composition to print items, where a feedstock of the composition is pushed through an extruder. The filament can be employed within the three-dimensional printing apparatus or system in the form of a filament wound onto a spool. The three-dimensional printing apparatus or system can include a cold end and a hot end. The cold end can draw the filament from the spool, using a gear- or roller-based feeding device to handle the filament and control the feed rate by means of a stepper motor. The cold end can further advance the filament feedstock into the hot end. The hot end can include a heating chamber and a nozzle, where the heating chamber includes a liquefier, which melts the filament to transform it into a thin liquid. This allows the molten composition to exit from a nozzle to form a thin, tacky bead that can adhere to a surface to which it is deposited upon. The nozzle may have any useful diameter and typically depending on resolution desired has a diameter of between 0.1 or 0.2 mm to 3 mm or 2 mm. Different types of nozzles and heating methods are used depending upon the composition, the object to be printed, and the desired resolution of the printing process.

In certain embodiments, the fused filament fabrication apparatus or system can employ an extruder, where filament is melted and extruded therefrom, in conjunction with a stepper motor and a hot end. The stepper motor can grip the filament, feed the filament to the hot end, which then melts the filament composition and depositing onto the print surface. The fused filament fabrication apparatus or system can employ a direct drive extruder or Bowden extruder. The direct drive extruder can have the stepper motor on the print head itself, where the filament can be pushed directly into the hot end. This configuration has the print head carrying the force of the stepper motor as it moves along the x-axis. The Bowden extruder can have the motor on the frame, away from the print head, and employs a Bowden tube. The motor can feed the filament through the Bowden tube (e.g., a PTFE tube) to the print head. The tube guides the filament from the fixed motor to the moving hot end, protecting the filament from snapping or being stretched by movement of the hot end during the printing process.

The compositions may be printed into an article as described herein. For example, a filament formed from the composition can be provided and the object can be printed using the filament in a fused filament fabrication process. Providing the filament may include extruding the composition from the filament. In certain embodiments, extruding the composition may include using one of a direct drive extruder and a Bowden extruder to form the 3D printed article from a filament of the composition.

Articles may be prepared by a fused filament fabrication process as provided herein. Such articles may be prepared by providing a filament formed from a composition as described and printing the object using the filament in a fused filament fabrication process to form an additive manufactured article comprised of at least two layers of the composition of the present invention. The filament may be formed by extruding the composition through a die with or without heating, but typically with heating. Objects produced by three-dimensional printing using such fused filament fabrication processes can be further processed by machining, milling, polishing, coating, painting, plating, deposition, etc.

Examples

The following non-limiting examples demonstrate further aspects of the present technology.

For each of the Examples and Comparative Examples, the polymers and any additives are fed to a 27 mm diameter barrel twin extruder (length/diameter=40) by separate auger feeders directly into the feed throat. The temperature of the barrel is about 210° C. to 215° C. The screw speed is 300 rpm. The overall run rate is about 70-90 pounds/hour. The ingredients are shown in Table 1. All compositions are by weight percent unless otherwise noted. The ingredients used to form the blended compositions are shown in Table 2. The results from the Examples and Comparative Examples are shown in Tables 3 and 4.

Examples 22-29 were made in the same was as described above and were 3d printed using an Ultimaker S5 to form peel test specimens. Examples 22-24 are made with 80% PEBAX 4033 (Arkema) and 20% NYLENE 6,69 (chopped with ~1 weight percent Hexahydrophthalic anhydride "HHPA" (Sigma Aldrich) in a manner as described in Example 1 of PCT/US2021/019391, incorporated herein by reference) and printed at 255° C. Example 25 is the same as Examples 22-24 except that it is printed at 265° C. Example 26 is made the same way as Examples 22-24, except that the PA 6,69 is chopped with trimellitic anhydride (TMA) obtained from The Chemical Company, Jamestown, Rhode Island. Comparative Example 8 is made the same way as Examples 22-24 except that no chopped Nylon plasticizer (for example, PA 6,69 as a nylon plasticizer) is used (neat PEBAX 4033). Example 27 is made the same way as Examples 22-24 except that instead of the chopped Nylon plasticizer, 10% melamine cyanurate (MC) obtained from Sigma Aldrich an adhesion promoter is used. Example 28 is the same as Example 27, except that 5% by weight of MC is used. The results of the peel test showing the z-direction strength of the specimens is shown in Table 4.

The coefficient of friction static (CoF static) and dynamic (CoF dynamic) are determined as per ASTM D1894. The weight of the sled used is 1 Kg and load cell used is a 50 KN cell.

The Shore Hardness is determined as per ASTM D 2240/ISO 868/ISO 7619. The tensile strength (TS), elongation at break (EAB) and elastic modulus (EM) are determine as per ASTM D638.

The peel strength of the additive article peel test specimens of Comparative Examples 8-13 is determined by printing, as described above, peel test specimens that are 200 mm long (x-direction)×25 mm wide (y direction)×50 mm (z direction), having an interior layer (one layer thickness) that extends 150 mm (50 mm gap at one end) from one end along the length leaving two tabs to be gripped when performing the peel test. The peel test is performed using peel test grips and Instron model 3369 at a pull rate of 500 mm/min. The material tears along the notch within 1 layer and displays a combination of cohesive and adhesive failure.

TABLE 1

| Composition component | Acronyms used herein | Company | Description |
|---|---|---|---|
| Polyether block amide | PEBAX 4033 | Arkema Inc. | thermoplastic elastomer made of flexible polyether and rigid polyamide |
| Polyether block amide | PEBAX2533 | Arkema Inc. | thermoplastic elastomer made of flexible polyether and rigid polyamide |
| styrene-(ethylene-butylene)-styrene (SEBS) | KRATON 1726 | Kraton Corp. | Thermoplastic elastomer |
| Elastomeric copolyester | ARNITEL PL461 | DSM | Copolyester thermoplastic elastomer |
| Polyketone | POKETONE | Hyosung | Aliphatic polyketone of carbon monoxide, ethylene and propylene. |
| Carbon fiber | Zoltek PX35 | Zoltek | Chopped 95% carbon fiber filler having average length 100 to 150 micrometers and diameter of 7.2 micrometers |
| Grilamid L16 polyamide | L16 PA6,69 | EMS | Nylon 12 Chopped polyamide plasticizer. Chopped with either Trimellitic anhydride or hexahydrophthalic anhydride at a concentration of 3% by weight as per copending application PCT/US2021/019391 |
| Melamine cyanurate | MC | | Adhesion promoter (z direction, i.e., layer to layer). |

TABLE 2

| Example | Pebax 2533 | PEBAX 4033 | KRATON 1726GV | Arnitel PL461 | POKETONE | L16 | PA6,69 | Zoltek 95 |
|---|---|---|---|---|---|---|---|---|
| 1 | | 80 | | | 20 | | | |
| 2 | | 85 | | | 15 | | | |
| 3 | | 90 | | | 10 | | | |
| Comp. 1 | | 70 | | | | | | 30 |
| Comp. 2 | | 80 | | | | | | 20 |
| Comp. 3 | | 90 | | | | | | 10 |
| Comp. 4 | | | | 100 | | | | |
| 4 | | | | 95 | 5 | | | |
| 5 | | | | 90 | 10 | | | |
| 6 | | | | 80 | 20 | | | |
| 6 | | | 80 | | 20 | | | |
| 7 | | | 90 | | 10 | | | |
| 8 | | | 95 | | 5 | | | |
| Comp. 5 | | | 100 | | 0 | | | |
| 9 | 80 | | | | 20 | | | |
| 10 | 90 | | | | 10 | | | |
| 11 | 95 | | | | 5 | | | |
| Comp. 6 | 100 | | | | 0 | | | |
| 12 | | 80 | | | 20 | | | |
| 13 | | 90 | | | 10 | | | |
| 14 | | 95 | | | 5 | | | |
| Comp. 7 | | 100 | | | 0 | | | |
| 15 | | 89.1 | | | 9.9 | | | |
| 16 | | 87.3 | | | 9.7 | | | |
| 17 | | 85.5 | | | 9.5 | | | |
| 18 | | 64 | | | 16 | 20 | | |
| 19 | | 72 | | | 18 | 10 | | |
| 20 | | 64 | | | 16 | | 20 | |
| 21 | | 72 | | | 18 | | 10 | |

TABLE 3

| | | | Data Summary | | | | |
|---|---|---|---|---|---|---|---|
| Example | CoF Static | CoF Dynamic | Shore A | Shore D | E mod [MPa] | UTS [MPa] | EAB [%] |
| 1 | | | | 49 | 186.4 | 31.9 | >300 |
| 2 | | | | 48 | 124.7 | 30.5 | >300 |
| 3 | | | 95 | 46 | 105.9 | 27.9 | >300 |
| Comp. 1 | | | | 52 | 792.3 | 24.4 | 9.37 |
| Comp. 2 | | | | 48 | 471.7 | 21 | 11.75 |
| Comp. 3 | | | | 45 | | | |
| Comp. 4 | 0.65 | 0.42 | | 53 | 150.72 | 14.57 | — |
| 4 | 0.4 | 0.26 | | 54.2 | 175.18 | 15.67 | — |
| 5 | 0.36 | 0.22 | | 55.6 | 197.07 | 15.25 | — |
| 6 | 0.36 | 0.21 | | 57.2 | 247.68 | 16.61 | — |
| 6 | 0.94 | 0.75 | 82.2 | 30.4 | | | |
| 7 | 0.96 | 0.83 | 79.8 | 27.2 | | | |
| 8 | | | | | | | |
| Comp. 5 | | | 78.3 | 25 | 384.18 | 4.92 | — |
| 9 | 0.41 | 0.38 | 82.2 | 31.8 | 26.51 | 5.44 | — |
| 10 | | | | | | | |
| 11 | | | | | | | |
| Comp. 6 | 0.78 | 0.76 | 75.8 | 26.6 | 11.53 | 3.65 | — |
| 12 | 0.51 | 0.35 | | 49.2 | 232.89 | 14.38 | — |
| 13 | 0.5 | 0.36 | | 47.4 | 151.89 | 12.41 | — |
| 14 | 0.45 | 0.34 | | 45.8 | 120.54 | 11.21 | — |
| Comp. 7 | 0.435 | 0.36 | | 44.2 | 88.37 | 9.22 | — |
| 15 | 0.435 | 0.33 | | 45.5 | 115.88 | 11.49 | — |
| 16 | 0.475 | 0.365 | | 43.6 | 101.61 | 10.58 | — |
| 17 | 0.43 | 0.34 | | 41.6 | 88.46 | 9.94 | — |
| 18 | | | | 56 | | | |
| 19 | | | | 52 | | | |
| 20 | | | | 54.4 | | | |
| 21 | | | | 51.2 | | | |

| Example | Maximum Load (N) | Maximum Load/ Thickness (N/mm) |
|---|---|---|
| 22 | 226.394 | 9.129 |
| 23 | 182.339 | 7.352 |
| 24 | 148.409 | 5.984 |
| 25 | 133.775 | 5.394 |
| 26 | 147.120 | 5.932 |
| Comp. 8 | 119.209 | 4.807 |
| 27 | 184.880 | 7.455 |
| 28 | 305.823 | 12.332 |

What is claimed is:

1. A composition comprising:
a thermoplastic elastomer blended with an aliphatic polyketone, wherein the thermoplastic elastomer is a continuous phase having dispersed therein separated domains of polyketone.

2. The composition of claim 1, wherein the thermoplastic elastomer is a styrenic thermoplastic elastomer, polyether block amide elastomer or combination thereof.

3. The composition of claim 1, wherein the polyketone is present in an amount of about 1% to 25% by weight of the composition.

4. The composition of claim 2, wherein the styrenic thermoplastic elastomer is a block copolymer that has a form that is either A-B-A or A-B-A-B-A, where A is a vinyl aromatic polymer block and B is a conjugated diene block.

5. The composition of claim 2, wherein the styrenic thermoplastic elastomer is a styrene-(ethylene-butylene)-styrene (SEBS) thermoplastic elastomer.

6. The composition of claim 1, wherein the polyketone is present in an amount of 1% to 15% by weight of the polyketone and thermoplastic elastomer.

7. A filament comprising the composition of claim 1.

8. The composition of claim 7, wherein the filament has a diameter of about 1 millimeter to about 3 millimeters.

9. The composition of claim 1 further comprising a friction modifier.

10. The composition of claim 9, wherein the friction modifier is a stearate.

11. The composition of claim 1, wherein the thermoplastic elastomer is a polyether block amide copolymer.

12. A method to form an additive manufactured article comprising:
(i) heating and extruding the composition of claim 1 through a print head to form an extrudate, and,
(ii) controllably depositing the extrudate into multiple fused layers to form the additive manufactured article.

13. The method of claim 12 wherein the extruding is by a 3D printer having a Bowden tube.

14. The method of claim 12, wherein the composition is in the form of a filament having a diameter of about 0.5 millimeter to 3 millimeters.

15. An additive manufactured article comprising a plurality of layers fused or adhered together, wherein at least two layers are comprised of a composition comprising a thermoplastic elastomer blended with an aliphatic polyketone, wherein the thermoplastic elastomer is a continuous phase having dispersed therein separated domains of polyketone.

16. The article of claim 15, wherein, the polyketone is present in an amount of 1% to 25% by weight of the thermoplastic elastomer and polyketone.

17. The article of claim 16, wherein the thermoplastic elastomer is comprised of one or more of a styrene-(butadiene)-styrene (SBS), styrene-isoprene-styrene (SIS), styrene isoprene butylene styrene (SIBS), and/or styrene-(ethylene-butylene)-styrene (SEBS) or polyether block amide copolymer (PEBA).

18. The article of claim 15, wherein the layers comprised of the composition comprising the thermoplastic elastomer blended with the aliphatic polyketone are is further comprised of a friction modifier.

19. The article of claim 18, wherein the layers are further comprised of a filler.

20. The article of claim 15, wherein the article is formed by fused filament fabrication.

* * * * *